(12) United States Patent
Ribo et al.

(10) Patent No.: US 9,673,963 B1
(45) Date of Patent: Jun. 6, 2017

(54) MULTI-PROTOCOLS AND MULTI-DATA RATES COMMUNICATIONS

(71) Applicant: Keyssa Systems, Inc., Portland, CA (US)

(72) Inventors: Jerome Jean Ribo, San Jose, CA (US); Bruno Tourette, Cupertino, CA (US); Pavan Hanumolu, Champaign, IL (US)

(73) Assignee: Keyssa Systems, Inc., Campbell, CA (US)

( * ) Notice: Subject to any disclaimer, the term of this patent is extended or adjusted under 35 U.S.C. 154(b) by 0 days.

(21) Appl. No.: 15/097,069

(22) Filed: Apr. 12, 2016

(51) Int. Cl.
*H04L 7/00* (2006.01)
*H04L 7/033* (2006.01)
*H04L 27/22* (2006.01)
*H04L 27/00* (2006.01)

(52) U.S. Cl.
CPC ............ *H04L 7/0008* (2013.01); *H04L 7/002* (2013.01); *H04L 7/033* (2013.01); *H04L 27/22* (2013.01); *H04L 2027/0067* (2013.01)

(58) Field of Classification Search
CPC ....... H04L 7/0008; H04L 7/033; H04L 7/002; H04L 27/22; H04L 7/0031; H04L 7/0338; H04L 2027/0067
See application file for complete search history.

(56) References Cited

U.S. PATENT DOCUMENTS

| 5,119,406 | A | * | 6/1992 | Kramer | H04J 3/0623 370/504 |
|---|---|---|---|---|---|
| 7,349,509 | B2 | | 3/2008 | Ribo et al. | |
| 2001/0006544 | A1 | * | 7/2001 | Kawasaki | H03L 7/081 375/376 |
| 2002/0075980 | A1 | * | 6/2002 | Tang | G06F 5/12 375/372 |
| 2008/0192873 | A1 | * | 8/2008 | Tamura | H04L 7/0338 375/355 |
| 2013/0064115 | A1 | * | 3/2013 | Toyoda | H04L 12/26 370/252 |
| 2015/0131766 | A1 | * | 5/2015 | Chen | H04L 7/033 375/372 |

* cited by examiner

*Primary Examiner* — Syed Haider
(74) *Attorney, Agent, or Firm* — Fish & Richardson P.C.

(57) ABSTRACT

Systems, methods, and apparatus for regenerating a data signal and a clock signal are provided. One of the apparatuses include clock regeneration loop circuitry configured to receive an input data signal transmitted without a reference clock signal, and to generate an output reference clock signal having an adjustable clock frequency that substantially matches a data rate of the input data signal; data detection loop circuitry configured to generate a phase offset control signal for adjusting a phase of a clock signal that samples the input data signal, and to generate, based on the phase offset control signal, a sampled input data signal; and an elastic buffer configured to generate, based on the output reference clock signal and the sampled input data signal, an output data signal that substantially aligns with the output reference clock signal, and enable the different adaptation dynamic of the loops.

20 Claims, 3 Drawing Sheets

MULTI-PROTOCOLS AND MULTI-DATA RATES COMMUNICATIONS

BACKGROUND

This specification relates to data communications.

Conventionally, to synchronize data transmissions between a transmitter and receiver, a reference clock signal may be transmitted with a data signal. In general, growth in bandwidth in modern data transmission follows a logarithm law, and network and point-to-point connections favor high-speed data transfers without a reference clock signal.

During high-speed data transfers jitters may be created that contaminate the signal being transferred. A re-timer may be used to clean jitters and synchronize data transmissions. Conventionally, to synchronize data transmissions without communicating a reference clock signal, a narrow frequency offset between the transmitter and receiver may be used. For example, in a passive optical network (PON), a clean local reference is generated at a receiver to synchronize the received data, but the difference between the transmitter frequency and receiver frequency is limited to 200 ppm (part-per-million). Due to the limited bandwidths, multi-protocols and multi-data rates data transmissions cannot be achieved with this conventional approach.

SUMMARY

In general, one innovative aspect of the subject matter described in this specification can be embodied in apparatuses that include a re-timer, the re-timer includes clock regeneration loop circuitry configured to receive an input data signal transmitted without a reference clock signal, and to generate, based on the input data signal, an output reference clock signal having an adjustable clock frequency that substantially matches a data rate of the input data signal. The re-timer includes data detection loop circuitry configured to generate, based on the input data signal, a phase offset control signal for adjusting a phase of a clock signal that samples the input data signal, and to generate, based on the phase offset control signal, a sampled input data signal. The re-timer includes an elastic buffer coupled to the clock regeneration loop circuitry and the data detection loop circuitry, the elastic buffer configured to store an overflowing portion or an under-flowing portion of the sampled input data signal resulting from a frequency difference between the output reference clock signal and the sampled input data signal. The elastic buffer is further configured to generate, based on the stored overflowing portion or the under-flowing portion of the sampled input data signal, an output data signal that substantially aligns with the output reference clock signal.

The main role of the elastic buffer to enable different adaptation and tracking capabilities between the data detection loop and the clock regeneration loop. This results in an invention with high jitter tolerance and low jitter generation.

The foregoing and other embodiments can each optionally include one or more of the following features, alone or in combination. In particular, one embodiment includes all the following features in combination. The re-timer may include a data rate detector configured to determine the data rate of the input signal based on the input data signal. The data rate detector may be configured to detect a data protocol of the input data signal.

The clock regeneration loop circuitry may include a first phase detector, an integrator, and an oscillator. The first phase detector may be coupled to the integrator and the oscillator. The integrator may be coupled to the first phase detector and the oscillator. The oscillator may be configured to generate the output reference clock signal. The first phase detector may be configured to determine a phase difference between the output reference clock signal and the input data signal. The integrator may be configured to determine an average phase difference based on the phase difference and accumulated phase difference. Based on the average phase difference, the integrator may also generate a clock regeneration control signal to adjust a frequency of the output reference clock signal generated by the oscillator.

The data detection loop circuitry may include a delay locked loop, a phase interpolator, and a second phase detector. The delay locked loop may be coupled to the clock regeneration loop and the phase interpolator. The phase interpolator may be coupled to the delay locked loop and the second phase detector. The second phase detector may be coupled to the phase interpolator and the elastic buffer. The delay locked loop may be configured to generate a phase-locked clock signal based on the output reference clock signal. The phase interpolator may be configured to generate a phase-adjusted clock signal based on the phase-locked clock signal and the phase offset control signal from the second phase detector. The second phase detector may be configured to determine a phase difference between the phase-adjusted clock signal and the input data signal, and to adjust the phase offset control signal based on the phase difference.

Based on the phase-locked clock signal and the adjusted phase offset control signal, the phase interpolator may be configured to generate an updated phase-adjusted clock signal after the second phase detector adjusts the phase offset control signal. The second phase detector may be configured to sample the input data signal using the updated phase-adjusted clock signal. The second phase detector may include an offset control unit configured to determine whether the phase difference between the phase-adjusted clock signal and the input data signal satisfies a threshold condition. In response to determining whether the phase difference between the phase-adjusted clock signal and the input data signal satisfies the threshold condition, the second phase detector may apply an additional adjustment to the phase offset control signal.

The elastic buffer may be configured to determine a phase shift between the output reference clock signal and the sampled input data signal, and to apply the phase shift to the sampled input data signal to generate the output data signal that substantially aligns with the output reference clock signal. The elastic buffer may be a pipelined buffer.

Advantageous implementations may include one or more of the following features. A re-timer supports multi-protocols and/or multi-data rates data transmissions without a reference clock signal. Fewer components are necessary for detecting data transmission without a clock signal. A re-timer tracks and removes jitters created during data transmission. An elastic buffer allows reference clock regeneration and data detection to be independent of each other. The elastic buffer may be implemented as a pipelined first-in-first-out (FIFO). The output data signal tracks the regenerated signal with low jitter generation, has noise clock spreading capability, and low latency. Synchronized and clean clock and data signals can be outputted to other device components, e.g., for processing the data.

The details of one or more embodiments of the invention are set forth in the accompanying drawings and the descrip-

BRIEF DESCRIPTION OF DRAWINGS

Like reference symbols in the various drawings indicate like elements.

DETAILED DESCRIPTION

This specification describes a re-timer architecture for data transmissions. In particular, this specification describes a re-timer architecture that supports multi-protocols and/or multi-data rates transmissions, where a transmission of a reference clock signal is not provided. The re-timer architecture described in this specification may be used in wired communications or contactless communications. Wired communications may include signal communications between components on a device, between devices, or between systems using electrical or optical cables. Contactless communications may include signal communications between components on a device, between devices, or between systems without the use of cables. For example, tightly-coupled transmitter/receiver pairs may be deployed with a transmitter disposed at a terminal portion of a first conduction path and a receiver disposed at a terminal portion of a second conduction path. The transmitter and receiver may be disposed in close proximity to each other depending on the frequencies and strength of the transmitted energy, and the first conduction path and the second conduction path may not be contiguous with respect to each other.

Figure 1:
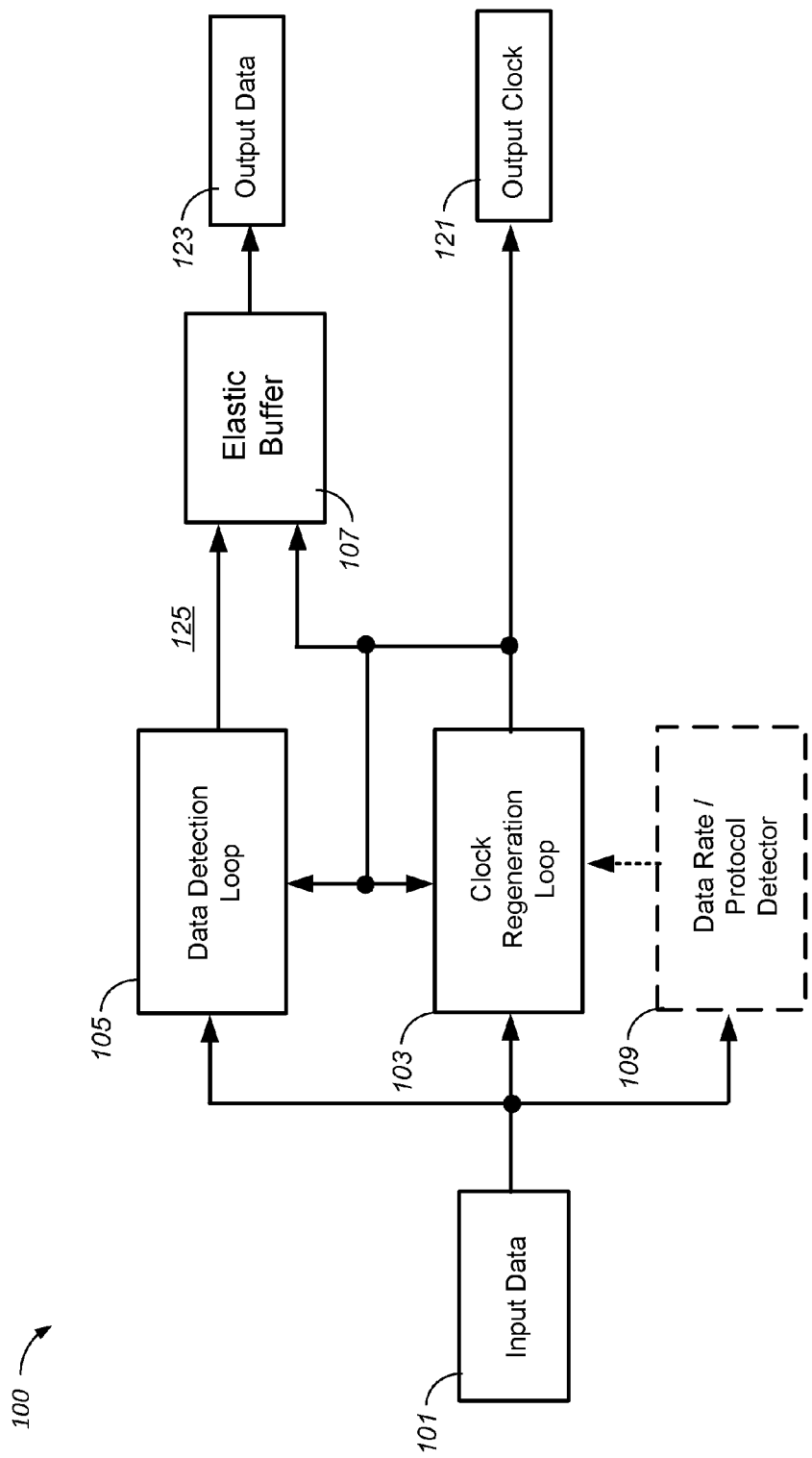
FIG. 1 is a block diagram of an example re-timer.

FIG. 1 shows an example re-timer 100. The re-timer 100 may be an apparatus, a system, a sub-system of a system, circuitry that performs the functions described below, or any combination thereof. In general, the re-timer 100 receives an input data signal 101 without a reference clock signal, and generates an output clock signal 121 and an output data signal 123 that can be sampled by the output clock signal 121. The re-timer 100 includes a clock regeneration loop 103, a data detection loop 105, and an elastic buffer 107. In some implementations, the re-timer 100 may include a data rate/protocol detector 109.

In general, the clock regeneration loop 103 includes circuitry that is configured to regenerate a clean output clock signal 121 based on the received input data signal 101, where the output clock signal 121 may be used to re-sample the output data. The output clock signal 121 is looped back to the clock regeneration loop 103, and the clock regeneration loop 103 is further configured to track/adapt the output clock signal 121 to the variations in the input data signal 101 that occur over time. An example variation in the input data signal 101 may include jitters. The input data signal 101 may include data that has been encoded using a particular protocol at a particular data rate. For example, the input data signal 101 may include data that has been encoded using the USB 3.0 protocol at 5 Gbps.

In some implementations, if the data rate and the data protocol of the input data signal 101 are pre-configured in the re-timer 100 prior to receiving the input data signal 101, the clock regeneration loop 103 may regenerate an output clock signal 121 upon receiving the input data 101. For example, if the re-timer 100 is pre-configured to receive data from a transmitter at 5 Gbps, the clock regeneration loop 103 may regenerate an output clock signal 121 that samples data at 5 Gbps.

In some other implementations, if the data rate and the data protocol of the input data signal 101 are unknown prior to receiving the input data signal 101, the clock regeneration loop 103 may regenerate an output clock signal 121 after the data rate/protocol detector 109 determines the data rate and the data protocol of the input data signal 101. In general, the data rate/protocol detector 109 includes circuitry that is configured to determine the data rate and the data protocol of the input data signal 101. In some implementations, the data rate/protocol detector 109 may be configured to determine the data rate or the data protocol of the input data signal 101 based on one or more characteristics of the input data signal 101. For example, an 8 bit to 10 bit encoder (an 8b/10b encoder) may encode input data with certain characteristics such as run length, edge count, transition density, or direct current (DC) balance. The data rate/protocol detector 109 may be configured to determine the data rate of the input data signal 101 based on the edge count of the data within a specific period of time. The data rate/protocol detector 109 may be configured to determine the data protocol of the input data signal 101 based on the transition density of the data. In some implementations, after the data rate/protocol detector 109 determines the data rate and the data protocol of the input data signal 101, the data rate/protocol detector 109 may be configured to generate a clock signal that is provided to the clock regeneration loop 103 to regenerate the output clock signal 121.

In general, the data detection loop 105 includes circuitry configured to determine one or more phase points for sampling the input data signal 101 to generate sampled data 125. In some implementations, the data detection loop 105 may be configured to receive the input data signal 101 and the output clock signal 121 as inputs, and to determine the one or more phase points by comparing a phase difference between the input data signal 101 and a phase delayed image of the output clock signal 121. For example, jitters may vary over time in the input data signal 101, and the data detection loop 105 may compare a current leading edge of the input data signal 101 and a leading edge of the phase delayed output clock signal 121 to determine a phase difference between the input data signal 101 and the phase delayed output clock signal 121. The data detection loop 105 may determine one or more updated phase points for sampling the input data signal 101 based on the comparison.

In general, the elastic buffer 107 includes circuitry configured to receive the output clock signal 121 and the sampled data 125 to generate the output data signal 123. Since the clock regeneration loop 103 and the data detection loop 105 are two independent loops, the clock going through each loop may have a phase difference. In some implementations, the elastic buffer 107 is configured to determine the phase difference between the output clock signal 121 and the sampled data 125, and to generate the output data signal 123 where the phase difference is compensated. For example, the elastic buffer 107 may add a latency to the output sampled data 125, such that the output clock signal 121 and the output data signal 123 are synchronized to each other. In some other implementations, the elastic buffer 107 is configured to provide a phase shift between the output clock signal 121 and the sampled data 125 to compensate for the phase difference. The amount of phase shift may be controlled based on an external control signal.

Figure 2:
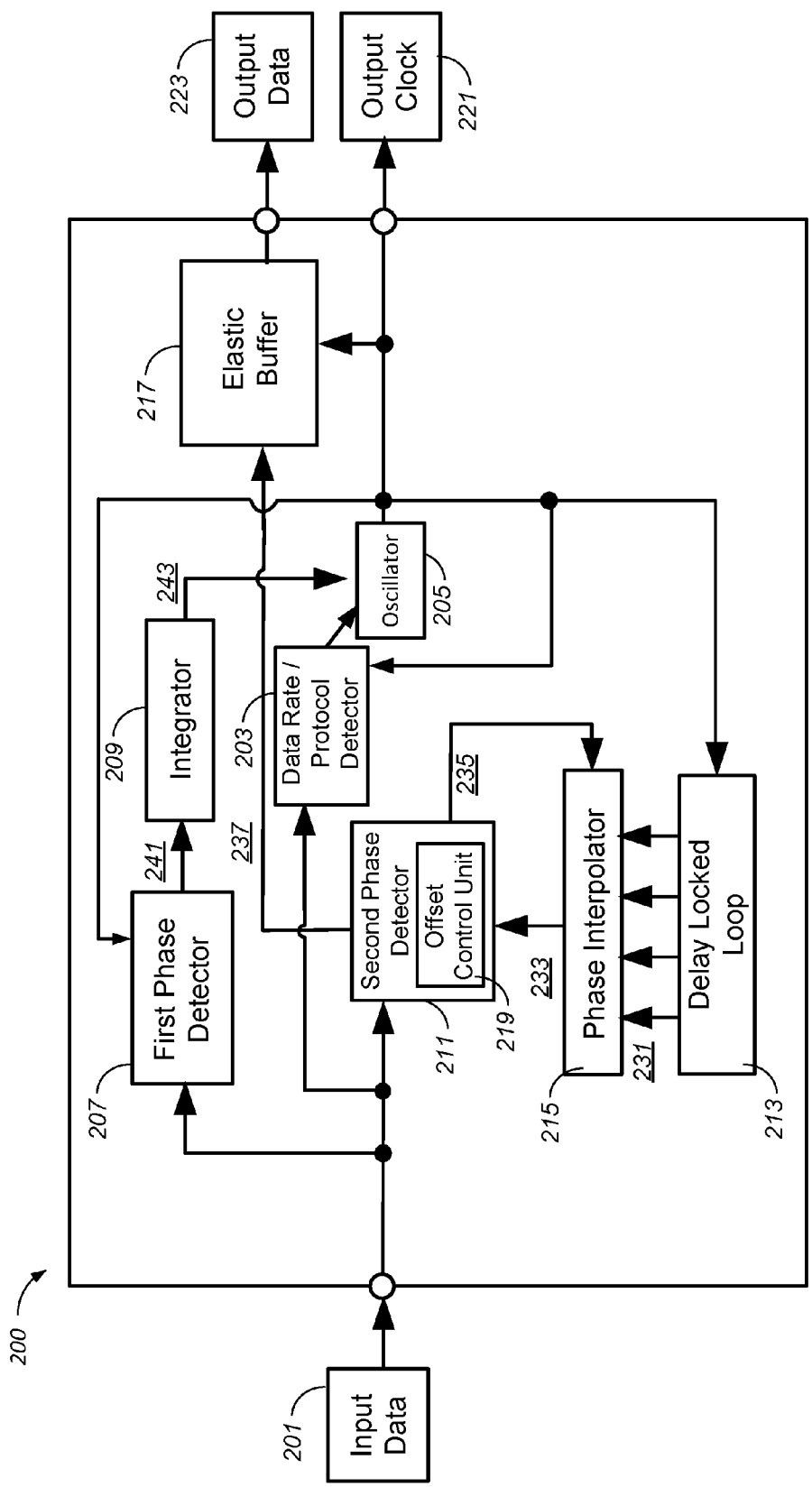
FIG. 2 is a block diagram of an example re-timer.

FIG. 2 shows a block diagram of an example re-timer 200 that illustrates one example implementation of the re-timer 100. The implementation of the re-timer 100 is not limited to the descriptions of the example re-timer 200. In general, the re-timer 200 receives an input data signal 201 without a reference clock signal, and generates an output clock signal 221 and an output data signal 223 that can be sampled by the output clock signal 221. The re-timer 200 includes a data rate/protocol detector 203, an oscillator 205, a first phase detector 207, an integrator 209, a second phase detector 211, a delay locked loop 213, a phase interpolator 215, and an elastic buffer 217.

The data rate/protocol detector 203 is similar to the data rate/protocol detector 109. In some implementations, the data rate/protocol detector 203 is configured to determine the data rate of the input data signal based on the input data signal 201. In some implementations, the data rate/protocol detector 203 is configured to detect a data protocol of the input data signal 201. The oscillator 205 may be an electronic oscillator that is controlled by a control signal to generate a clock output having an oscillation frequency. For example, if oscillator is a voltage controlled oscillator (VCO), the oscillation frequency is determined by an applied voltage control. In some implementations, after the data rate/protocol detector 203 determines the data rate of the input data signal 201, the data rate/protocol detector 203 may recalibrate the oscillator 205 to generate an output clock signal 221 having a frequency that substantially matches the data rate of the input data signal 201, such that the output clock signal 221 may be used to sample the output data signal 223.

In some implementations, the first phase detector 207, the integrator 209, and the oscillator 205 may form a clock regeneration loop for adjusting the output clock signal 221 that is similar to the clock regeneration loop 103. For example, the first phase detector 207 is electrically coupled to the integrator 209 and the oscillator 205, and the integrator 209 is electrically coupled to the first phase detector 207 and the oscillator 205 to form the clock regeneration loop.

The first phase detector 207 is configured to determine a phase difference 241 between the output clock signal 221 and the input data signal 201. The first phase detector 207 may be implemented using circuitry that receives the output clock signal 221 and the input data signal 201 and generates an output signal that represents a phase difference between the output clock signal 221 and the input data signal 201. For example, the first phase detector 207 may be a bang-bang phase detector, a phase frequency detector, an analog multiplier phase detector, a binary phase detector, an oversampling phase detector, or any other suitable phase detectors that may perform the function of phase detection.

The integrator 209 is configured to determine an average phase difference based on the phase difference 241 and an accumulated phase difference. Based on the average phase difference, the integrator 209 may be configured to generate a clock regeneration control signal 243 to adjust the frequency of the output clock signal 221 generated by the oscillator 205, such that the output clock signal 221 may be adjusted according to jitters that occur over time in the input data signal 201 while maintaining a clean signal. The clock regeneration loop, including the phase detector 207, the integrator 209, and the oscillator 205 may behave similar to a low-pass filter.

In some implementations, the delay locked loop 213, the phase interpolator 215, and the second phase detector 211 form a data detection loop that is similar to the data detection loop 105. The data detection loop may generate, based on the input data signal 201, a phase offset control signal 235 for adjusting a phase of a clock signal that samples the input data signal 201 and generate, based on the phase offset control signal 235, a sampled input data signal 237. For example, the phase interpolator 215 is coupled to the delay locked loop 213 and the second phase detector 211, which is electrically coupled back to the phase interpolator 215 to form the data detection loop.

The delay locked loop 213 is electrically coupled to oscillator 205, and is configured to generate, based on the output clock signal 221, a phase-locked clock signal 231. The delay locked loop 213 may be implemented using circuitry that receives the output clock signal 221, and delays the output clock signal 221 based on a delay a comparison between the delayed clock generated by the delay locked loop 213 and the output clock signal 221.

The phase interpolator 215 is configured to generate a phase-adjusted clock signal 233 based on the phase offset control signal 235 from the second phase detector 211. For example, the phase interpolator 215 may delay the phase-locked clock signal 231 to generate the phase-adjusted clock signal 233, where the delay is controlled by the phase offset control signal 235.

The second phase detector 211 is configured to determine a phase difference between the phase-adjusted clock signal 233 from the phase interpolator 215 and the input data signal 201. Based on the phase difference, the second phase detector 211 is configured to adjust the phase offset control signal 235 that is looped back to the phase interpolator 215. The second phase detector 211 may be implemented using circuitry that receives the phase-adjusted clock signal 233 and the input data signal 201 and generates the phase offset control signal 235 that represents a phase difference between the phase-adjusted clock signal 233 and the input data signal 201. For example, the second phase detector 211 may be a bang-bang phase detector, an oversampling phase detector, or any other suitable phase detectors that may perform the function of phase detection.

In some implementations, the second phase detector 211 may include an offset control unit 219. The offset control unit 219 is configured to determine whether the phase difference between the phase-adjusted clock signal 233 and the input data signal 201 satisfies a threshold condition, and in response to determining that the phase difference satisfies the threshold condition, the offset control unit 219 may apply an additional adjustment to the phase offset control signal 235. For example, if the phase difference of the input data signal 201 is unexpectedly lagging during a certain period, the offset control unit 219 may detect this unexpected event by determining that the phase difference between the phase-adjusted clock signal 233 and the input data signal 201 exceeds a threshold, and the offset control unit 219 may subsequently apply a larger phase offset control signal 235 to the phase interpolator 215.

The second phase detector 211 is further configured to sample the input data signal 201 using the phase-adjusted clock signal 233. In some implementations, the second phase detector 211 may select one or more phase points for sampling the input data signal 201 to generate sampled input data 237. For example, the second phase detector 211 may select a phase point for sampling the input data signal 201 near the leading or the falling edges of the input data signal 201.

The elastic buffer 217 is coupled to the oscillator 205 and the second phase detector 211. The elastic buffer 217 is configured to receive the output clock signal 221 and the sampled input data 237 and to generate an output data signal 223 that substantially aligns with the output reference clock signal 221, such that the output reference clock signal 221 may be used to sample the output data signal. In some implementations, the elastic buffer 217 may determine a phase shift between the output clock signal 221 and the sampled input data 237, and apply the phase shift to the sampled input data 237 to generate the output data signal 223 that substantially aligns with the output reference clock signal. The elastic buffer 217 may be implemented using a pipelined buffer circuit. In some other implementations, separate circuitry may be used to determine a phase shift between the output clock signal 221 and the sampled input data 237, and the elastic buffer 217 may be controlled by the separate circuitry to apply a delay between the output clock signal 221 and the sampled input data 237 to compensate the phase shift, and to generate the output data signal 223 that substantially aligns with the output reference clock signal. Consequently, the elastic buffer 217 acts as an interface between the two clock domains by storing and releasing an overflowing and/or an under-flowing portion of the sampled input data 237. A portion of the sampled input data 237 may be data bits of the sampled input data 237. An example of storing a portion of the sampled input data 237 may include stacking the portion of the sampled input data 237 in the elastic buffer 217. An example of releasing a portion of the sampled input data 237 may include un-stacking the portion of the sampled input data 237 in the elastic buffer 217. This process allows the data detection loop and clock regeneration loop to have separate and distinct adaptation/tracking capabilities that result in high jitters tolerances and low jitters generation.

Figure 3:
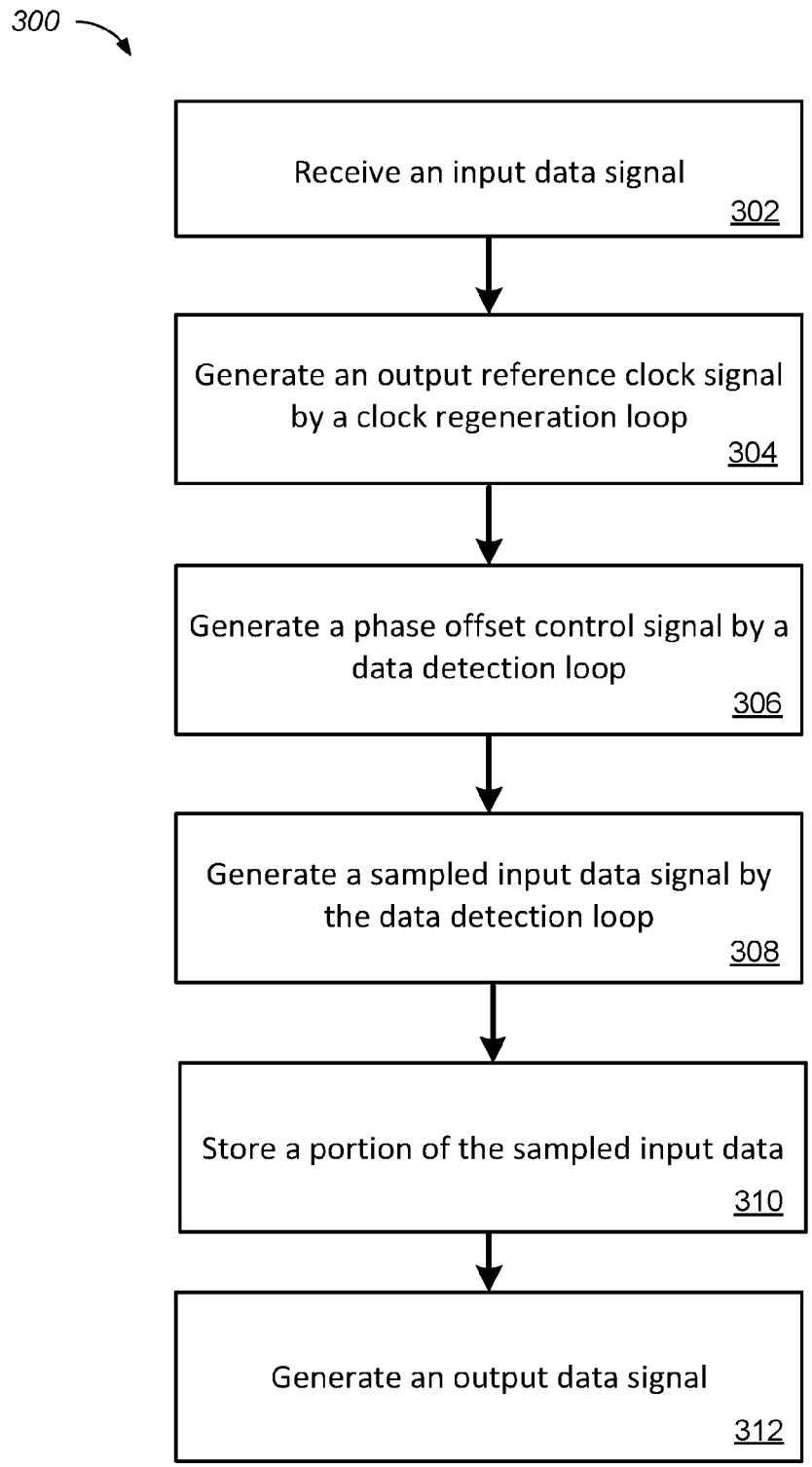
FIG. 3 is a flow diagram that illustrates an example of a process for generating a data signal and a clock signal.

FIG. 3 is a flow diagram that illustrates an example of a process 300 for generating a data signal and a clock signal. The process 300 may be performed by a re-timer, such as the re-timer 100 or the re-timer 200 described above, or another re-timer apparatus.

The re-timer receives an input data signal transmitted without a reference clock signal (302). For example, the re-timer 200 may receive the input data signal 201. In some implementations, the re-timer determines the data rate of the input data signal. For example, the data rate/protocol detector 203 may determine the data rate of the input data signal 201 based on the edge count of the data within a specific period of time. In some implementations, the re-timer determines a data protocol of the input data signal. For example, the data rate/protocol detector 203 may determine the data protocol of the input data signal 201 based on the transition density of the data.

The re-timer generates, by a clock regeneration loop and based on the input data signal, an output reference clock signal having an adjustable clock frequency that substantially matches a data rate of the input data signal (304). In some implementations, the clock regeneration loop includes a first phase detector, an integrator, and an oscillator. For example, the clock regeneration loop may include the first phase detector 207, the integrator 209, and the oscillator 205. The clock regeneration loop may generate the output reference clock signal based on the data rate of the input data signal determined by the data rate detector. For example, the oscillator 205 may generate the output clock signal 221 based on the data rate of the input data signal determined by the data rate/protocol detector 203. The clock regeneration loop may determine a phase difference between the output reference clock signal and the input data signal. For example, the first phase detector 207 may determine a phase difference between the output clock signal 221 and the input data signal 201. The clock regeneration loop may determine an average phase difference based on the phase difference and an accumulated phase difference. For example, the integrator 209 may determine an average phase difference based on the phase difference 241 and an accumulated phase difference.

Based on the average phase difference, the clock regeneration loop may generate a clock regeneration control signal to adjust a frequency of the output reference clock signal generated by the oscillator. For example, based on the average phase difference, the integrator 209 may be configured to generate a clock regeneration control signal 243 to adjust a frequency of the output clock signal 221 generated by the oscillator 205, such that the output clock signal 221 may be adjusted according to jitters accumulated over time in the input data signal 20 while maintaining a clean signal.

The re-timer generates, by a data detection loop and based on the input data signal, the re-timer generates a phase offset control signal for adjusting a phase of a clock signal that samples the input data signal (306). In some implementations, the data detection loop includes a delay locked loop, a phase interpolator, and a second phase detector. For example, the delay locked loop 213, the phase interpolator 215, and the second phase detector 211 forms a data detection loop.

The data detection loop may generate a phase-locked clock signal based on the output reference clock signal. For example, the delay locked loop 213 may generate a phase-locked clock signal 231 based on the output clock signal 221. Based on the phase-locked clock signal and the phase offset control signal from the second phase detector, the data detection loop may generate a phase-adjusted clock signal. For example, the phase interpolator 215 may delay the phase-locked clock signal 231 to generate the phase-adjusted clock signal 233, where the delay is controlled by the phase offset control signal 235.

The data detection loop may determine a phase difference between the phase-adjusted clock signal and the input data signal. For example, the second phase detector 211 may determine a phase difference between the phase-adjusted clock signal 233 from the phase interpolator 215 and the input data signal 201. The data detection loop may adjust the phase offset control signal based on the phase difference. For example, based on the phase difference, the second phase detector 211 may adjust the phase offset control signal 235 that is looped back to the phase interpolator 215 to adjust phase-adjusted clock signal 233.

In some implementations, the data detection loop includes an offset control unit. For example, the second phase detector 211 may include an offset control unit 219. The data detection loop may determine that the phase difference between the phase-adjusted clock signal and the input data signal satisfies a threshold condition. In response to determining that the phase difference satisfies the threshold condition, the data detection loop may apply an additional adjustment to the adjusted phase offset control signal. For example, if the phase difference of the input data signal 201 is unexpectedly lagging during a certain period, the offset control unit 219 may detect this unexpected event by determining that the phase difference between the phase-adjusted clock signal 233 and the input data signal 201 exceeds a threshold. The offset control unit 219 may subsequently apply a larger phase offset control signal 235 to the phase interpolator 215 to compensate for the phase difference.

In some implementations, after adjusting the phase offset control signal, the data detection loop generates an updated phase-adjusted clock signal based on the phase-locked clock signal and the adjusted phase offset control signal. For example, after the second phase detector 211 adjusts the phase offset control signal 235, the phase interpolator may generate an updated phase-adjusted clock signal 233 based on the adjusted phase offset control signal 235.

The re-timer generates a sampled input data signal (308) based on the phase offset control signal and the date detection loop. In some implementations, the data detection loop may sample the input data signal using the phase-adjusted clock signal. For example, using the phase-adjusted clock signal 233, the second phase detector 211 may select one or more phase points for sampling the input data signal 201 to generate sampled input data 237.

The re-timer stores, by an elastic buffer, a portion of the sampled input data (310). In some implementations, the elastic buffer stores an overflowing portion or an underflowing portion of the sampled input data signal based on a comparison between the output reference clock signal and the sampled input data signal. For example, the elastic buffer 217 may receive the output clock signal 221 and the sampled input data signal 237. The elastic buffer 217 may compare the output clock signal 221 and the sampled input data signal 237 and determine that there is an N-clock cycle difference between the output clock signal 221 and the sampled input data signal 237, where N is an integer. The elastic buffer 217 may store the N clock cycle of the sampled input data signal 237 to set the output data 223 delay/latency to a predetermined value.

The re-timer generates, by the elastic buffer and based on the stored overflowing portion or the under-flowing portion of the sampled input data signal, an output data signal that substantially aligns with the output reference clock signal (312). In some implementations, the re-timer may determine, by the elastic buffer, a phase shift between the output reference clock signal and the sampled input data signal. The re-timer may apply, by the elastic buffer, the phase shift to the sampled input data signal to generate the output data signal that substantially aligns with the output reference clock signal. For example, the elastic buffer 217 of FIG. 2 is configured to receive the output clock signal 221 and the sampled input data 237 and to generate an output data signal 223 that substantially aligns with the output reference clock signal 221, such that the output reference clock signal 221 may be used to sample the output data signal 223.

A number of embodiments of the invention have been described. Nevertheless, it will be understood that various modifications may be made without departing from the spirit and scope of the invention. Accordingly, other embodiments are within the scope of the following claims.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for generating a data signal and a clock signal, the method comprising:
   receiving an input data signal transmitted without a reference clock signal;
   generating, by a clock regeneration loop and based on the input data signal, an output reference clock signal having an adjustable clock frequency that matches a data rate of the input data signal;
   generating, by a data detection loop and based on the input data signal, a phase offset control signal for adjusting a phase of a clock signal that samples the input data signal;
   generating, by the data detection loop and based on the phase offset control signal, a sampled input data signal;
   storing, by an elastic buffer, an overflowing portion or an under-flowing portion of the sampled input data signal resulting from a frequency difference between the output reference clock signal and the sampled input data signal; and
   generating, by the elastic buffer and based on the stored overflowing portion or the under-flowing portion of the sampled input data signal, an output data signal that aligns with the output reference clock signal,
   wherein the data detection loop includes a delay locked loop, a phase interpolator, and a phase detector,
   wherein generating the phase offset control signal further comprises:
      generating, by the delay locked loop and based on the output reference clock signal, a phase-locked clock signal;
      generating, by the phase interpolator and based on the phase-locked clock signal and the phase offset control signal from the phase detector, a phase-adjusted clock signal;
      determining, by the phase detector, a phase difference between the phase-adjusted clock signal and the input data signal; and
      adjusting, by the phase detector and based on the phase difference, the phase offset control signal.

2. The method of claim 1, further comprising:
   determining, based on the input data signal, the data rate of the input data signal.

3. The method of claim 2, further comprising:
   determining, based on the input data signal, a data protocol of the input data signal.

4. The method of claim 2,
   wherein the clock regeneration loop includes a second phase detector, an integrator, and an oscillator, and wherein generating the output reference clock signal further comprises:
  generating, by the oscillator and based on the data rate of the input data signal determined by a data rate detector, the output reference clock signal;
  determining, by the second phase detector, a phase difference between the output reference clock signal and the input data signal;
  determining, by the integrator and based on the phase difference and an accumulated phase difference, an average phase difference; and
  generating, by the integrator and based on the average phase difference, a clock regeneration control signal to adjust a frequency of the output reference clock signal generated by the oscillator.

5. The method of claim 1, wherein generating the sampled input data signal further comprises:
  after adjusting the phase offset control signal, generating, by the phase interpolator and based on the phase-locked clock signal and the adjusted phase offset control signal, an updated phase-adjusted clock signal; and
  sampling, by the phase detector, the input data signal using the updated phase-adjusted clock signal.

6. The method of claim 1,
  wherein the phase detector includes an offset control unit, and
  wherein determining the phase offset control signal further comprises:
    determining, by the offset control unit, that the phase difference between the phase-adjusted clock signal and the input data signal satisfies a threshold condition; and
    in response to determining that the phase difference between the phase-adjusted clock signal and the input data signal satisfies the threshold condition, applying an additional adjustment to the adjusted phase offset control signal.

7. The method of claim 1,
  wherein generating the output data signal further comprises:
    determining a phase shift between the output reference clock signal and the sampled input data signal; and
    applying the phase shift to the sampled input data signal to generate the output data signal that aligns with the output reference clock signal.

8. An apparatus for generating a data signal and a clock signal, the apparatus comprising:
  clock regeneration loop circuitry configured to:
    receive an input data signal transmitted without a reference clock signal; and
    generate, based on the input data signal, an output reference clock signal having an adjustable clock frequency that matches a data rate of the input data signal;
  data detection loop circuitry comprising a delay locked loop, a phase interpolator, and a phase detector, the data detection loop circuitry configured to:
    generate, based on the input data signal, a phase offset control signal for adjusting a phase of a clock signal that samples the input data signal; and
    generate, based on the phase offset control signal, a sampled input data signal,
    wherein the delay locked loop is configured to generate, based on the output reference clock signal, a phase-locked clock signal,
    wherein the phase interpolator is configured to generate, based on the phase-locked clock signal and the phase offset control signal from the phase detector, a phase-adjusted clock signal, and
    wherein the phase detector is configured to:
      determine a phase difference between the phase-adjusted clock signal and the input data signal; and
      adjust, based on the phase difference, the phase offset control signal; and
  an elastic buffer coupled to the clock regeneration loop circuitry and the data detection loop circuitry, the elastic buffer configured to:
    store an overflowing portion or an under-flowing portion of the sampled input data signal resulting from a frequency difference between the output reference clock signal and the sampled input data signal; and
    generate, based on the stored overflowing portion or the under-flowing portion of the sampled input data signal, an output data signal that aligns with the output reference clock signal,
    wherein the delay locked loop is coupled to the clock regeneration loop circuitry and the phase interpolator,
    wherein the phase interpolator is coupled to the delay locked loop and the phase detector,
    wherein the phase detector is coupled to the phase interpolator and the elastic buffer.

9. The apparatus of claim 8, further comprising:
  a data rate detector configured to determine, based on the input data signal, the data rate of the input data signal.

10. The apparatus of claim 9, wherein the data rate detector is configured to detect a data protocol of the input data signal.

11. The apparatus of claim 9,
  wherein the clock regeneration loop circuitry includes a second phase detector, an integrator, and an oscillator, and
  wherein the second phase detector is coupled to the integrator and the oscillator,
  wherein the integrator is coupled to the second phase detector and the oscillator,
  wherein the oscillator is configured to generate the output reference clock signal,
  wherein the second phase detector is configured to determine a phase difference between the output reference clock signal and the input data signal, and
  wherein the integrator is configured to:
    determine, based on the phase difference and an accumulated phase difference, an average phase difference; and
    generate, based on the average phase difference, a clock regeneration control signal to adjust a frequency of the output reference clock signal generated by the oscillator.

12. The apparatus of claim 8,
  wherein the phase interpolator is further configured to:
    after the phase detector adjusts the phase offset control signal, generate, based on the phase-locked clock signal and the adjusted phase offset control signal, an updated phase-adjusted clock signal, and
  wherein the phase detector is configured to sample the input data signal using the updated phase-adjusted clock signal.

13. The apparatus of claim 8, wherein the phase detector includes an offset control unit configured to:
  determine that the phase difference between the phase-adjusted clock signal and the input data signal satisfies a threshold condition; and in response to determining that the phase difference between the phase-adjusted clock signal and the input data signal satisfies the threshold condition, apply an additional adjustment to the phase offset control signal.

14. The apparatus of claim 8,
wherein the elastic buffer is configured to:
determine a phase shift between the output reference clock signal and the sampled input data signal; and
apply the phase shift to the sampled input data signal to generate the output data signal that aligns with the output reference clock signal.

15. The apparatus of claim 8, wherein the elastic buffer is a pipelined buffer.

16. A system comprising:
a communication system configured to receive an input data signal transmitted without a reference clock signal, the communication system including a re-timer, wherein the re-timer comprises a clock regeneration loop, a data detection loop, and an elastic buffer, and wherein the re-timer is configured to:
receive the input data signal;
generate, by the clock regeneration loop and based on the input data signal, an output reference clock signal having an adjustable clock frequency that matches a data rate of the input data signal;
generate, by the data detection loop and based on the input data signal, a phase offset control signal for adjusting a phase of a clock signal that samples the input data signal;
generate, by the data detection loop and based on the phase offset control signal, a sampled input data signal;
store, by the elastic buffer, an overflowing portion or an under-flowing portion of the sampled input data signal resulting from a frequency difference between the output reference clock signal and the sampled input data signal; and
generate, by the elastic buffer and based on the stored overflowing portion or the under-flowing portion of the sampled input data signal, an output data signal that aligns with the output reference clock signal,
wherein the data detection loop includes a delay locked loop, a phase interpolator, and a phase detector,
wherein generating the phase offset control signal further comprises:
generating, by the delay locked loop and based on the output reference clock signal, a phase-locked clock signal;
generating, by the phase interpolator and based on the phase-locked clock signal and the phase offset control signal from the phase detector, a phase-adjusted clock signal;
determining, by the phase detector, a phase difference between the phase-adjusted clock signal and the input data signal; and
adjusting, by the phase detector and based on the phase difference, the phase offset control signal.

17. The system of claim 16,
wherein the clock regeneration loop includes a second phase detector, an integrator, and an oscillator, and
wherein generating the output reference clock signal further comprises:
generating, by the oscillator and based on the data rate of the input data signal determined by a data rate detector, the output reference clock signal;
determining, by the second phase detector, a phase difference between the output reference clock signal and the input data signal;
determining, by the integrator and based on the phase difference and an accumulated phase difference, an average phase difference; and
generating, by the integrator and based on the average phase difference, a clock regeneration control signal to adjust a frequency of the output reference clock signal generated by the oscillator.

18. A method for generating a data signal and a clock signal, the method comprising:
receiving an input data signal transmitted without a reference clock signal;
generating, by a clock regeneration loop and based on the input data signal, an output reference clock signal having an adjustable clock frequency that matches a data rate of the input data signal;
generating, by a data detection loop and based on the input data signal, a phase offset control signal for adjusting a phase of a clock signal that samples the input data signal;
generating, by the data detection loop and based on the phase offset control signal, a sampled input data signal;
storing, by an elastic buffer, an overflowing portion or an under-flowing portion of the sampled input data signal resulting from a frequency difference between the output reference clock signal and the sampled input data signal; and
generating, by the elastic buffer and based on the stored overflowing portion or the under-flowing portion of the sampled input data signal, an output data signal that aligns with the output reference clock signal,
wherein the clock regeneration loop includes a phase detector, an integrator, and an oscillator, and
wherein generating the output reference clock signal further comprises:
generating, by the oscillator and based on the data rate of the input data signal determined by a data rate detector, the output reference clock signal;
determining, by the phase detector, a phase difference between the output reference clock signal and the input data signal;
determining, by the integrator and based on the phase difference and an accumulated phase difference, an average phase difference; and
generating, by the integrator and based on the average phase difference, a clock regeneration control signal to adjust a frequency of the output reference clock signal generated by the oscillator.

19. An apparatus for generating a data signal and a clock signal, the apparatus comprising:
clock regeneration loop circuitry comprising a phase detector, an integrator, and an oscillator, the clock regeneration loop circuitry configured to:
receive an input data signal transmitted without a reference clock signal; and
generate, based on the input data signal, an output reference clock signal having an adjustable clock frequency that matches a data rate of the input data signal;
data detection loop circuitry configured to:
generate, based on the input data signal, a phase offset control signal for adjusting a phase of a clock signal that samples the input data signal; and
generate, based on the phase offset control signal, a sampled input data signal,
wherein the phase detector is coupled to the integrator and the oscillator, wherein the integrator is coupled to the phase detector and the oscillator, wherein the oscillator is configured to generate the output reference clock signal, wherein the phase detector is configured to determine a phase difference between the output reference clock signal and the input data signal, and wherein the integrator is configured to:
- determine, based on the phase difference and an accumulated phase difference, an average phase difference; and
- generate, based on the average phase difference, a clock regeneration control signal to adjust a frequency of the output reference clock signal generated by the oscillator; and an elastic buffer coupled to the clock regeneration loop circuitry and the data detection loop circuitry, the elastic buffer configured to:
- store an overflowing portion or an under-flowing portion of the sampled input data signal resulting from a frequency difference between the output reference clock signal and the sampled input data signal; and
- generate, based on the stored overflowing portion or the under-flowing portion of the sampled input data signal, an output data signal that aligns with the output reference clock signal.

20. A system comprising:

a communication system configured to receive an input data signal transmitted without a reference clock signal, the communication system including a re-timer, wherein the re-timer comprises a clock regeneration loop, a data detection loop, and an elastic buffer, and wherein the re-timer is configured to:

receive the input data signal;

generate, by the clock regeneration loop and based on the input data signal, an output reference clock signal having an adjustable clock frequency that matches a data rate of the input data signal;

generate, by the data detection loop and based on the input data signal, a phase offset control signal for adjusting a phase of a clock signal that samples the input data signal;

generate, by the data detection loop and based on the phase offset control signal, a sampled input data signal;

store, by the elastic buffer, an overflowing portion or an under-flowing portion of the sampled input data signal resulting from a frequency difference between the output reference clock signal and the sampled input data signal; and generate, by the elastic buffer and based on the stored overflowing portion or the under-flowing portion of the sampled input data signal, an output data signal that aligns with the output reference clock signal, wherein the clock regeneration loop includes a phase detector, an integrator, and an oscillator, and wherein generating the output reference clock signal further comprises:
- generating, by the oscillator and based on the data rate of the input data signal determined by a data rate detector, the output reference clock signal;
- determining, by the phase detector, a phase difference between the output reference clock signal and the input data signal;
- determining, by the integrator and based on the phase difference and an accumulated phase difference, an average phase difference; and
- generating, by the integrator and based on the average phase difference, a clock regeneration control signal to adjust a frequency of the output reference clock signal generated by the oscillator.

\* \* \* \* \*